Aug. 5, 1952     G. A. COOK ET AL     2,605,736

MAXIMUM AND MINIMUM REGISTERING INSTRUMENT

Filed Aug. 1, 1950

GARRETT A. COOK
CLARENCE F. ALDRIDGE
*INVENTOR.*

BY *D. Clyde Jones*
ATTORNEY

Patented Aug. 5, 1952

2,605,736

UNITED STATES PATENT OFFICE 2,605,736

MAXIMUM AND MINIMUM REGISTERING INSTRUMENT

Garrett A. Cook and Clarence F. Aldridge, Rochester, N. Y., assignors to Taylor Instrument Companies, Rochester, N. Y., a corporation of New York Application August 1, 1950, Serial No. 177,102

4 Claims. (Cl. 116—129)

This invention relates to an instrument for indicating the maximum and minimum values of a changing variable, such as a thermometer for indicating the maximum and minimum temperatures that have occurred during a given period.

In the case of a maximum and minimum indicating thermometer, it is frequently desirable to locate the sensing mechanism of the instrument where it will be exposed to outside temperatures and yet it should be provided with means whereby after the maximum and minimum temperatures for a given period have been observed, the registering indexes of the thermometer can be reset from the inside of the building.

The present invention has for its main purpose the production of a maximum and minimum registering thermometer in a position to be visible from the interior of the building and which can be reset by remote control means from the inside of the building.

A further purpose of the invention is the production of a remotely reset maximum and minimum temperature which is relatively inexpensive to manufacture, which is relatively simple to assemble and which is reliable in operation over long periods of time.

The various features and advantages of the invention will appear from the detailed description and the claims when taken with the drawing in which:

Figure 4:
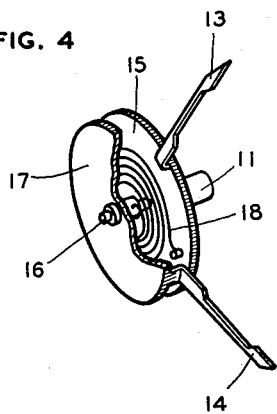
Fig. 4 is a fragmentary perspective view of the mounting of the registering indexes.
Figure 1:
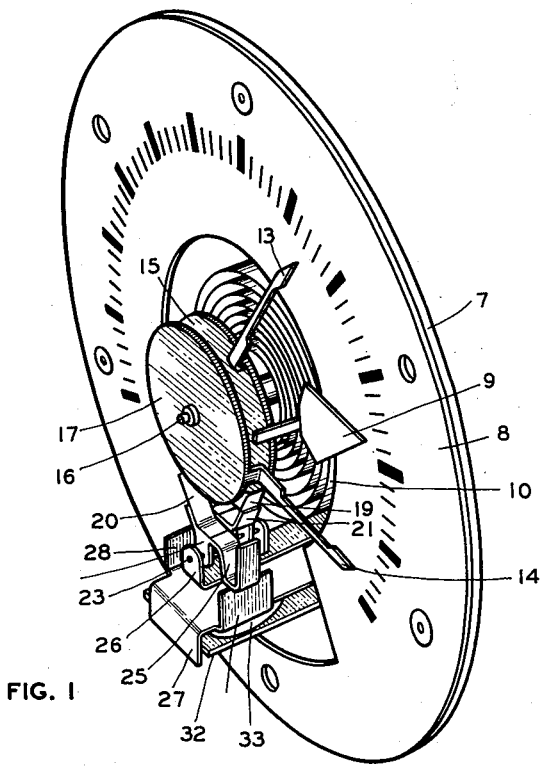
Fig. 1 is a perspective view of the registering thermometer of the present invention with the protective case thereof removed.
Figure 3:
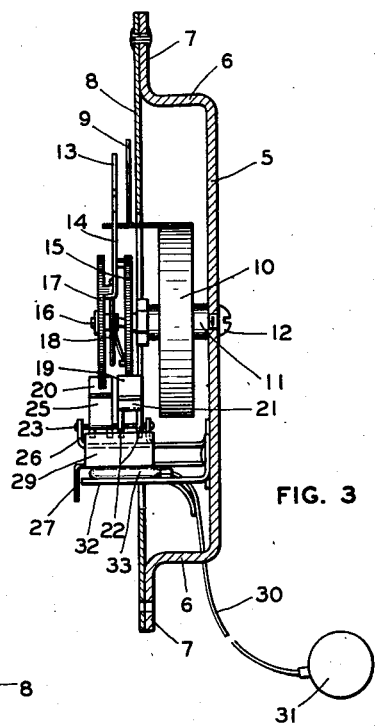
Fig. 3 is a vertical section of the thermometer as shown in Fig. 2.
Figure 2:
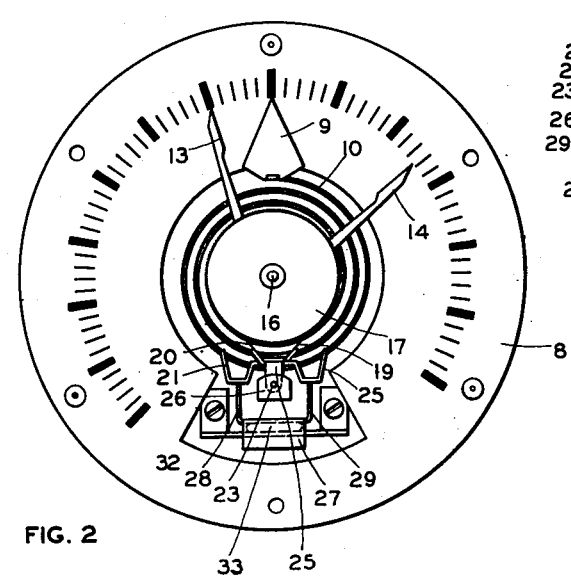
Fig. 2 is a front view of the present thermometer with the protective case removed.

Referring to the drawings, the numeral 5 designates a frame on which the mechanism of the thermometer is mounted. This frame is preferably in the form of a cup having upturned portions 6 terminating in the end portions 7 extending in a plane parallel to the main plane of the frame proper. The end portions 7 of the frame have secured thereto an annular dial 8 with its front surface suitably graduated in degrees of temperature, the graduations being arranged in a circular position about the margin of the dial. A movable pointer 9 is arranged to swing in an arc over the graduations on the dial to indicate various temperatures to which the instrument is exposed. The index 9 is secured to the outer end of a bimetallic coil 10 which is responsive to the changes in ambient temperature, the inner end of this coil being secured to a stud 11 in turn fastened to the frame 5 by screw 12. The bimetallic coil 10 has its main plane extending parallel to the dial 8 and parallel to the main portion of the frame 5, to afford a relatively thin instrument.

In accordance with the present invention, there is provided a minimum registering index 13 swung by a counter-clockwise movement of the pointer 9 and a maximum registering index 14 swung by a clockwise movement of the pointer 9, thereby registering the greatest distance of travel of the pointer in each direction during a given period. The registering index 13 projects radially from a disc 15 to sweep over the graduation on the dial. This disc is rotatably mounted on a pin 16, the pin being mounted on the stud 11 to extend through the center of the dial 8. The maximum registering index 14 is likewise mounted to extend radially from a second disc 17 also rotatably mounted on the pin 16 so that the index 14 can sweep over the graduations on the dial. A hair spring 18 has one of its ends secured to the disc 15 and has its other end secured to the disc 17. By this arrangement the spring 18 tends to rotate the discs 15 and 17, when released, in a direction to swing the minimum registering index 13 against one side of the pointer 9 and to swing the maximum registering index 14 against the other side of the pointer 9 in whatever position this pointer happens to be. However in order to retain the registering indexes 13 and 14 at the end of their maximum arcs of travel until they are reset, the edges of the discs 15 and 17 are provided with knurling or ratchet teeth to be engaged by the releasable retaining pawls 19 and 20. These pawls are similarly mounted and under the action of gravity tend to swing into engagement with the ratchet teeth on the edges of their respective discs. Specifically the somewhat flexible pawl 19 is mounted on a rigid rotatable arm 21 having apertured downturned ears 22 to receive a pivot pin 23. The somewhat flexible pawl 20 is likewise mounted on a rigid arm 25 having apertured downturned ears to receive the pivot pin 23. This pivot pin is mounted in the upturned ears on the bracket 26 which is secured on the base 5 to support the pivot pin in parallel relation with the axis of the discs 15 and 17. It should be pointed out that the arms 21 and 25 are so weighted that they tend to swing their respective pawls 19 and 20 into engagement with the ratchet teeth on their related discs.

In order to reset the registering indexes 13 and 14 into engagement with the pointer 9, mechanism is provided to release the pawls 19 and 20 whereby the hair spring 18 can swing these indexes toward each other until they are stopped by the pointer. This mechanism includes a leaf spring 27 secured at one end to the frame 5 and having its other end terminating under the arms 21 and 25. Preferably the spring 27 is formed with upstanding lugs 28 and 29 engaging respectively the arms 21 and 25 so that an upward movement of the free end of the spring 27 moves these arms to disengage the pawls 19 and 20 from their respective discs 15 and 17. The free end of the spring 27 can be moved upward in any convenient manner. As herein illustrated, the spring 27 is moved upward by an expansible chamber 33 engaging the under side of the spring and resting on the rigid support 32 carried by the frame 5. This chamber communicates through a flexible tube 30 with a flexible manual bulb 31 located at a point remote from the thermometer proper.

When it is desired to reset the indexes 13 and 14, the bulb 31 is squeezed to transmit an impulse of air to chamber 33 causing it to expand. The expansion of chamber 33 moves the leaf spring 27 upward which releases the pawls 19 and 20. This permits the hair spring 18 to rotate the discs 15 and 17 as well as the indexes 13 and 14 respectively carried thereon, until these indexes are stopped by contact with the pointer 9.

While the spring 27 is shown as operated by pneumatic means, it can be operated by other remote actuating means, without departing from the present invention.

What we claim is:

1. In a maximum and minimum registering instrument for indicating the changing values of a variable, a dial graduated in units of the variable, a rotatable pointer cooperating with said dial, means responsive to changes in the variable being indicated for moving the pointer to the appropriate graduation on the dial corresponding to the present value of the variable, a pair of discs rotatable in planes parallel to the plane of movement of the pointer, a minimum registering index carried on one disc to cooperate with the graduations on the dial and arranged to be moved by the pointer as it travels through its greatest excursion in one direction, a maximum registering index carried by the other disc to cooperate with the graduations on the dial and arranged to be moved by the pointer as it travels through it greatest excursion in the other direction, a hair spring having one of its ends attached to one disc and having its other end attached to the other disc whereby said indexes are biassed toward the respective sides of said pointer, a pawl individual to each disc and normally engaging its disc to retain it in the position to which it has been set by the greatest excursion of the pointer, means including a weighted arm carrying each pawl and tending to hold its pawl in engagement with its related disc, and means operated at will for moving said arms to release said pawls from said discs whereby their respective indexes are brought by said hair spring into engagement with the respective sides of said pointer in whatever position it happens to occupy.

2. In a maximum and minimum registering instrument for indicating the changing values of a variable, a dial graduated in units of the variable, a rotatable pointer cooperating with said dial, means responsive to changes in the variable being indicated for moving the pointer to the appropriate graduation on the dial corresponding to the present value of the variable, a pair of discs rotatable in planes parallel to the plane of movement of the pointer, a minimum registering index carried on one disc to cooperate with the graduations on the dial and arranged to be moved by the pointer as it travels through its greatest excursion in one direction, a maximum registering index carried by the other disc to cooperate with the graduations on the dial and arranged to be moved by the pointer as it travels through its greatest excursion in the other direction, a hair spring having one of its ends attached to one disc and its other end attached to the other disc whereby said indexes are biassed toward the respective sides of said pointer, a pawl individual to each disc and normally engaging its disc to retain it in the position to which it has been set by the greatest excursion of the pointer, means including an arm carrying each pawl and tending to hold its pawl in engagement with its related disc, and means including a pneumatically expansible chamber operated at will for moving said arms to release said pawls from said discs whereby their respective indexes are brought by said hair spring into engagement with the respective sides of said pointer in whatever position it happens to occupy.

3. In a maximum and minimum registering instrument for indicating the changing values of a variable, a dial graduated in units of the variable, a rotatable pointer cooperating with said dial, means responsive to changes in the variable being indicated for moving the pointer to the appropriate graduation of the dial corresponding to the present value of the variable, a pair of discs rotatable in planes parallel to the plane of movement of the pointer, a minimum registering index carried on one disc to cooperate with the graduations on the dial and arranged to be moved by the pointer as it travels through its greatest excursion in one direction, a maximum registering index carried by the other disc to cooperate with the graduations on the dial and arranged to be moved by the pointer as it travels through its greatest excursion in the other direction, a hair spring having one of its ends attached to one disc and its other end attached to the other disc whereby said indexes are biassed toward the respective sides of said pointer, a pawl individual to each disc and normally engaging its disc to retain it in the position to which it has been set by the greatest excursion of the pointer, means including an arm carrying each pawl and tending to hold its pawl in engagement with its related disc, means including a pneumatically expansible chamber operated at will for moving said arms to release said pawls from said discs whereby their respective indexes are brought by said hair spring into engagement with the respective sides of said pointer in whatever position it happens to occupy and a manually operated contractible chamber for generating an air impulse, and a pipe communicating with both of said chambers.

4. In a maximum and minimum registering instrument for indicating the changing values of a variable, a dial graduated in units of the variable, a rotatable pointer cooperating with said dial, means responsive to changes in the variable being indicated for moving the pointer to the appropriate graduation on the dial corresponding to the present value of the variable, a pair of discs rotatable in planes parallel to the plane of movement of the pointer, a minimum registering index carried on one disc to cooperate with the graduations on the dial and arranged to be moved by the pointer as it travels through its greatest excursion in one direction, a maximum registering index carried by the other disc to cooperate with the graduations on the dial and arranged to be moved by the pointer as it travels through its greatest excursion in the other direction, means including a hair spring tending to rotate said indexes toward each other, whereby said indexes are biassed toward the respective sides of said pointer, a pawl individual to each disc and normally engaging its disc to retain it in the position to which it has been set by the greatest excursion of the pointer, and means operated at will for releasing said pawls from said discs whereby their respective indexes are brought by said hair spring into engagement with the respective sides of said pointer in whatever position it happens to occupy.

GARRETT A. COOK.
CLARENCE F. ALDRIDGE.

REFERENCES CITED

The following references are of record in the file of this patent:

UNITED STATES PATENTS

| Number | Name | Date |
|---|---|---|
| 1,686,035 | Rath | Oct. 2, 1928 |
| 2,110,391 | Davis | Mar. 8, 1938 |
| 2,433,541 | Bevins | Dec. 30, 1947 |